US007010180B2

(12) United States Patent
van Wijngaarden et al.

(10) Patent No.: US 7,010,180 B2
(45) Date of Patent: Mar. 7, 2006

(54) SYSTEM AND METHOD FOR MULTI-CHANNEL MITIGATION OF PMD/PDL/PDG

(75) Inventors: Adriaan J. de Lind van Wijngaarden, New Providence, NJ (US); Xiang Liu, Marlboro, NJ (US); Chongjin Xie, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 17 days.

(21) Appl. No.: 10/639,824

(22) Filed: Aug. 13, 2003

(65) Prior Publication Data

US 2005/0036727 A1 Feb. 17, 2005

Related U.S. Application Data

(63) Continuation-in-part of application No. 10/631,654, filed on Jul. 31, 2003, now abandoned.

(51) Int. Cl.
*G02B 6/00* (2006.01)

(52) U.S. Cl. ............................. 385/11; 385/3; 385/24; 359/483; 398/152

(58) Field of Classification Search ................. 385/11, 385/14, 24, 27, 28, 31, 123–128, 3; 359/483–502; 398/140, 152, 205
See application file for complete search history.

(56) References Cited

U.S. PATENT DOCUMENTS 6,437,892 B1 8/2002 Fang et al. ................. 359/156
6,856,711 B1 * 2/2005 Frigo et al. ................... 385/11

OTHER PUBLICATIONS

H. F. Haunstein et al., "BER Measurements Of A 40Gb/s Receiver With Adaptive Threshold Using Polarization Scrambling", *IEEE 2003 Digest Of The LEOS Summer Topics Meetings*, Jul. 14, 2003, pp 113-114.

E. Tangiongga et al., "Experimental Evaluation of Optical Crosstalk Mitigating Using Phase Scrambing", *IEEE Photonics Technology Letters*, vol. 12, No. 5, May 2000, pp 567-569.

I. T. Monroy et al., "Interometric Crosstalk Reduction By Phase Scrambling", *Journal of Lightwave Technology*, vol. 18, No. 5, May 2000, pp 637-646.

K. Inoue, "Suppression of Influence Of Homowavelength Crosstalk In An Optical Add/Drop Multiplexing System With Modulating LD Light Frequency", *Photonics Technology Letters*, vol. 11, No. 9, Sep. 1999, pp 1177-1179.

A. Yariv et al., "An Experimental and Theoretical Study of the Suppression of Interferometric Noise and Distrotion in AM Optical Links by Phase Dither", *Journal of Lightwave Technology*, vol. 15, No. 3, Mar. 1997, pp 437-443.

Lynn E. Nelson, "Challenges of 40Gb/s WDM Transmisison", *Tech, Digest OFC'01*, paper ThF1, 2001.

S. Särkimukka et al., "Mitigation Of Polarization-Mode Dispersion In Optical Multichannel Systems", *Journal of Lightwave Technology*, vol. 18, No. 10, Oct. 2000, pp 1374-1380.

R. Khosravani et al., "Polarization-Mode Dispersion Compensation in WDM Systems", *IEEE Photonics Technology Letters*, vol. 13, No. 12, Dec. 2001, pp 1370-1372.

(Continued)

*Primary Examiner*—Phan T. H. Palmer

(57) ABSTRACT

A system and method for multi-channel PMD/PDL/PDG mitigation, the system including polarization scramblers adapted to vary the state of polarization of an optical signal propagated through the system to effectively vary the polarization mode dispersion experienced by the signal during each burst-error-correcting-period of the forward error correction used in the system.

28 Claims, 6 Drawing Sheets

OTHER PUBLICATIONS

L. Möller et al., "Time-Sharing Of Compensators As A PMD Mitigation Approach For Multichannel Transmission Systems", *IEEE Photonics Technology Letters*, vol. 14, No. 5, May 2002, pp 861-863.

C. Xie et al., "Mitigation Of Polarization-Mode Dispersion In Multichannel Lightwave Transmission Systems", *IEEE Photonics Technology Letters*, vol. 15, No. 8, Aug. 2003, pp 1070-1072.

K. P. Ho et al., "Performance Analysis Of Optical Transmission System With Polarization-Mode Dispersion And Forward Error Correction", *IEEE Photonics Technology Letters*, vol. 9, No. 9, Sep. 1997, pp 1288-1290.

Y. Kisaka et al., "First- and Higher-Order PMD Tolerance Of Carrier-Suppressed Return-To-Zero Format With Forward Error Correction", *Proc. 27th Eur. Conf. on Opt. Comm.* (*ECOC'01—Amsterdam*), paper We.P.30, pp 438-439.

R. Khosravani et al., Time And Frequency Domain Characteristics Of Polarization -Mode Dispersion Emulators, *IEEE Photonics Technology Letters*, vol. 13, No. 2, Feb. 2001, pp 127-129.

F. Heisman et al., "Polarization-Independent Electro-Optical Depolarizer", *Optics Letters*, vol. 20, No. 9, May 1, 1995, pp 1008-1010.

B Wedding et al., "Enhanced PMD Mitigation By Polarization Scrambling And Forward Error Correction", *Proc. ECOC'00*, paper WAA1-1, 2000.

ITU-T Recommendation G.709/Y.1331, "Interfaces For The Optical Transport Network (OTN)" Feb. 2001, pp 71-72.

ITU-T Recommendation G.975 "Forward Error Correction For Submarine Systems", Oct. 2000, pp 9-11.

* cited by examiner

SYSTEM AND METHOD FOR MULTI-CHANNEL MITIGATION OF PMD/PDL/PDG

CROSS-REFERENCE TO RELATED APPLICATION

This is a continuation-in-part application of U.S. patent application Ser. No. 10/631,654 entitled "System And Method For Multi-Channel Mitigation of PMD/PDL/PDG" filed on Jul. 31, 2003 now abandoned which is incorporated herein by reference.

FIELD OF THE INVENTION

The present invention relates to optical communications, and more specifically to a system and method for mitigating the penalties resulting from polarization-mode-dispersion (PMD), polarization-dependent loss (PDL), and polarization-dependent gain (PDG) in optical communication systems.

BACKGROUND OF THE INVENTION

Polarization-mode-dispersion (PMD) is a common phenomenon that occurs when light waves travel in optical media such as optical fiber and optical amplifiers. PMD occurs in an optical fiber as a result of small birefringence induced by deviations of the fiber's core from a perfectly cylindrical shape, asymmetric stresses or strains, and/or random external forces acting upon the fiber. PMD causes the two orthogonal polarization components of an optical signal corresponding to two principle states of polarization (PSP) of a transmission link to travel at different speeds and arrive at a receiver with a differential group delay (DGD). As a result, the waveform of optical signals may be significantly distorted, resulting in more frequent errors at the receiver.

PMD is wavelength-dependent in that the amount or level of PMD imparted by an optical component (e.g., optical fiber) at a given time will generally vary for different wavelength-division-multiplexing (WDM) channels corresponding to different signal wavelengths or frequencies.

Polarization-dependent loss (PDL) is another common phenomenon in optical fiber transmission. Optical components such optical add/drop modules (OADM's) tend to have PDL, which attenuate optical signals depending on the relative polarization state with respect to the PSP's of the PDL component.

Polarization-dependent gain (PDG) is also a common phenomenon in optical fiber transmission. Optical components such as Erbium-doped fiber amplifiers (EDFAs), tend to have PDG, which amplify optical signals depending on their relative polarization state with respect to the PSPs of the PDG component. PDL and PDG cause signals to have different amplitudes at the receiver, which makes the optimal decision threshold different for different bits (depending on their polarization), and thus degrades the receiver performance when the receiver decision threshold can only be fixed to a certain level for all the bits. PDL may also cause varying optical signal-to-noise-ratio (OSNR) for bits with different polarization, and further degrade the system performance. PDL or PDG induced OSNR degradation cannot be compensated for since the process of adding random amplified spontaneous emission (ASE) noise cannot be undone.

It is known that PMD, PDL, and PDG are significant penalty sources in high-speed (e.g., 10 Gb/s and 40 Gb/s) transmissions. PMD compensation (PMDC) is normally desirable to increase system tolerance to PMD. However, due to the stochastic nature of PMD and its wavelength dependence, PMDC is normally required to be implemented for each wavelength channel individually, and is thus generally not cost-effective. Various prior art methods have been proposed to achieve PMDC simultaneously for multiple WDM channels. Channel switching is one technique that has been proposed to mitigate the overall PMD penalty in a WDM system. However, such systems sacrifice system capacity due to the use of extra channels for PMD protection. Multi-channel PMDC before wavelength de-multiplexing has also been proposed to mitigate the PMD degradation in the WDM channel having the most severe PMD. However, such a mitigation scheme may cause degradation of other channels.

Another scheme for a multi-channel shared PMDC has been proposed in which the most degraded channel is switched, by optical or electrical means, to a path connected to the shared PMDC; however, the speed of PMDC is limited (by the speed of the optical or electrical switching). In current PMDC schemes, PMD induced system outages, during which the PMD penalty exceeds its pre-allocated system margin and system failure occurs, are present, though reduced.

Forward-error-correction (FEC) is an effective technique for increasing system margin cost-effectively. It has been determined, however, that FEC cannot extend the tolerable PMD for a fixed PMD penalty at a given average bit-error-rate (BER), even though the additional margin provided by FEC can be used to increase the PMD tolerance. It has been suggested that sufficient interleaving in FEC may increase PMD tolerance. However, there is no known practical method to provide the deep interleaving needed to avoid a PMD outage which may last minutes or longer in practical systems.

SUMMARY OF THE INVENTION

The present invention provides a system and method for multi-channel PMD/PDL/PDG mitigation and outage prevention in which FEC is used in conjunction with sub-burst-error-correction-period (s-BECP) PMD vector scrambling (PMDS) using distributed, fast polarization scramblers (D-FPSs). BECP is in units of time, which equals burst error correction length (BECL) multiplied by the bit period. For ITU standard G.709, BECL=1024 bits. Thus, in a G.709 standardized 10.7-Gb/s system, the BECP is approximately $1024\times100$ ps$\approx$0.1 $\mu$s. The link PMD is preferably changed to at least two random states within each BECP simultaneously for all wavelength channels. By limiting PMD induced "outages" to last for a period that is shorter than the correcting period, FEC can effectively correct the dominating errors occurring during transmission. The present invention provides significant improvement in system tolerance to PMD and can essentially eliminate PMD induced system outages in NRZ and RZ transmissions.

According to one embodiment, the present invention is a system for mitigating the penalties from PMD, PDL and PDG. The system comprises at least one polarization scrambler adopted to vary the polarization state of an optical signal to effectively vary the polarization mode dispersion experienced by the signal at least once during each BECP of the FEC used in the system.

BRIEF DESCRIPTION OF THE DRAWING

The foregoing and other objects, features and advantages of the present invention will become more apparent from the following detailed description when taken in conjunction with the appended drawings.

It is to be noted, however, that the appended drawings illustrate only exemplary embodiments of the invention and are therefore not to be considered limiting of the scope of the invention.

DETAILED DESCRIPTION OF THE INVENTION

Figure 1A:
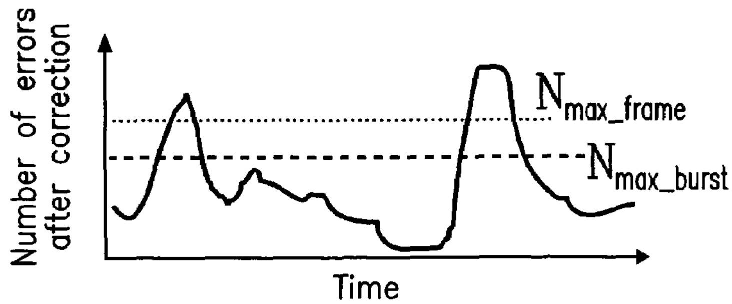
FIGS. 1A–D are plots illustrating a working principle of an embodiment of the present invention.
Figure 1B:
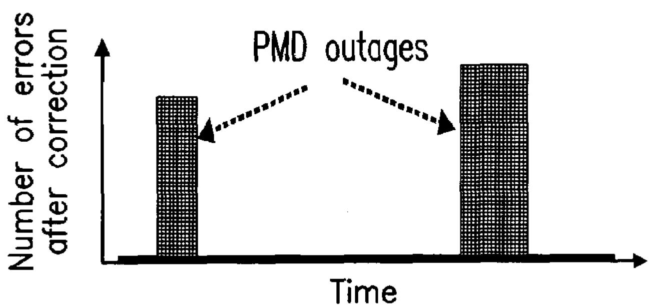

One aspect of the present invention proposes the use of FEC in conjunction with fast polarization scrambling to change the polarization of a signal between at least two states during each FEC burst-error-correcting period (BECP). By changing the link PMD at least once during each BECP the PMD induced "outages" are effectively limited to last for a period that is shorter than the correcting period, thus the FEC can effectively correct the dominating errors that occurred during the outages, and thereby improve system tolerance to PMD and prevent system outage, simultaneously for all wavelength channels FIGS. 1A–D illustrate a working principle of present invention. FIGS. 1A–B show the case without D-FPSs. As shown in FIGS. 1A–B, PMD occasionally causes severe signal waveform distortion, which results in consecutive or very frequent errors. Such PMD-induced distortion can last from milliseconds up to minutes.

For any given FEC code, there is a maximum number of correctable errors per FEC frame (or block), $N_{max\_frame}$. There is also a maximum number of correctable consecutive burst errors per FEC frame, $N_{max\_burst}$, (which is referred to herein as the BECL, and is generally less or equal to $N_{max\_frame}$). FEC is unable to correct the errors (and may even generate more errors) when the errors occur so frequently that during each FEC frame period (normally on the order of microseconds) the number of errors exceeds $N_{max\_frame}$, or occur consecutively for more than $N_{max\_burst}$ times. These events, during which a system fails (even with an allocated margin) because of PMD, are called PMD-induced outage events, as illustrated in FIG. 1B.

Figure 1C:
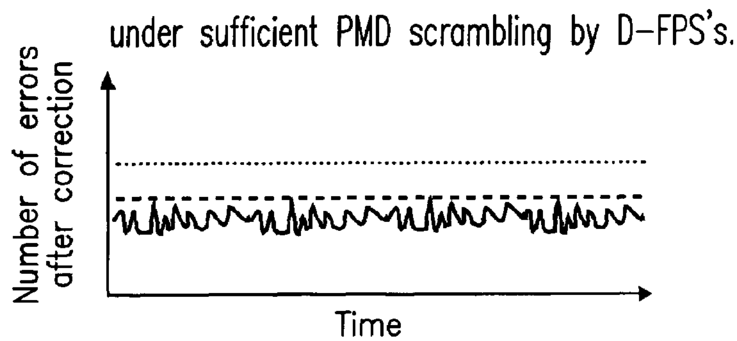
Figure 1D:
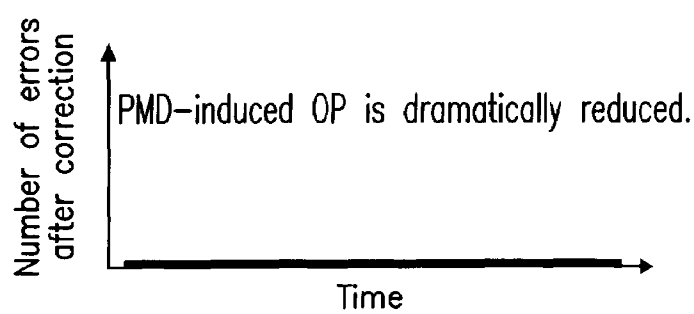

Using D-FPSs, in accordance with aspects of the present invention, to scramble the link PMD during each FEC frame, redistributes the link PMD to close to its original Maxwellian distribution, such that no consecutive errors (due to PMD) last longer than $N_{max\_burst}$, as shown in FIG. 1C. By doing so, the errors are substantially uniformly distributed when looking at a time resolution of an FEC frame period, and can thus be effectively corrected by FEC, providing an appropriate system margin is allocated for PMD. It can be understood that the total number of errors (before FEC correction) over an infinite time period will be the same for the two cases without and with D-FPSs. The redistribution of the link PMD effectively enables FEC to correct errors during what would otherwise be a PMD outage event.

Figure 2:
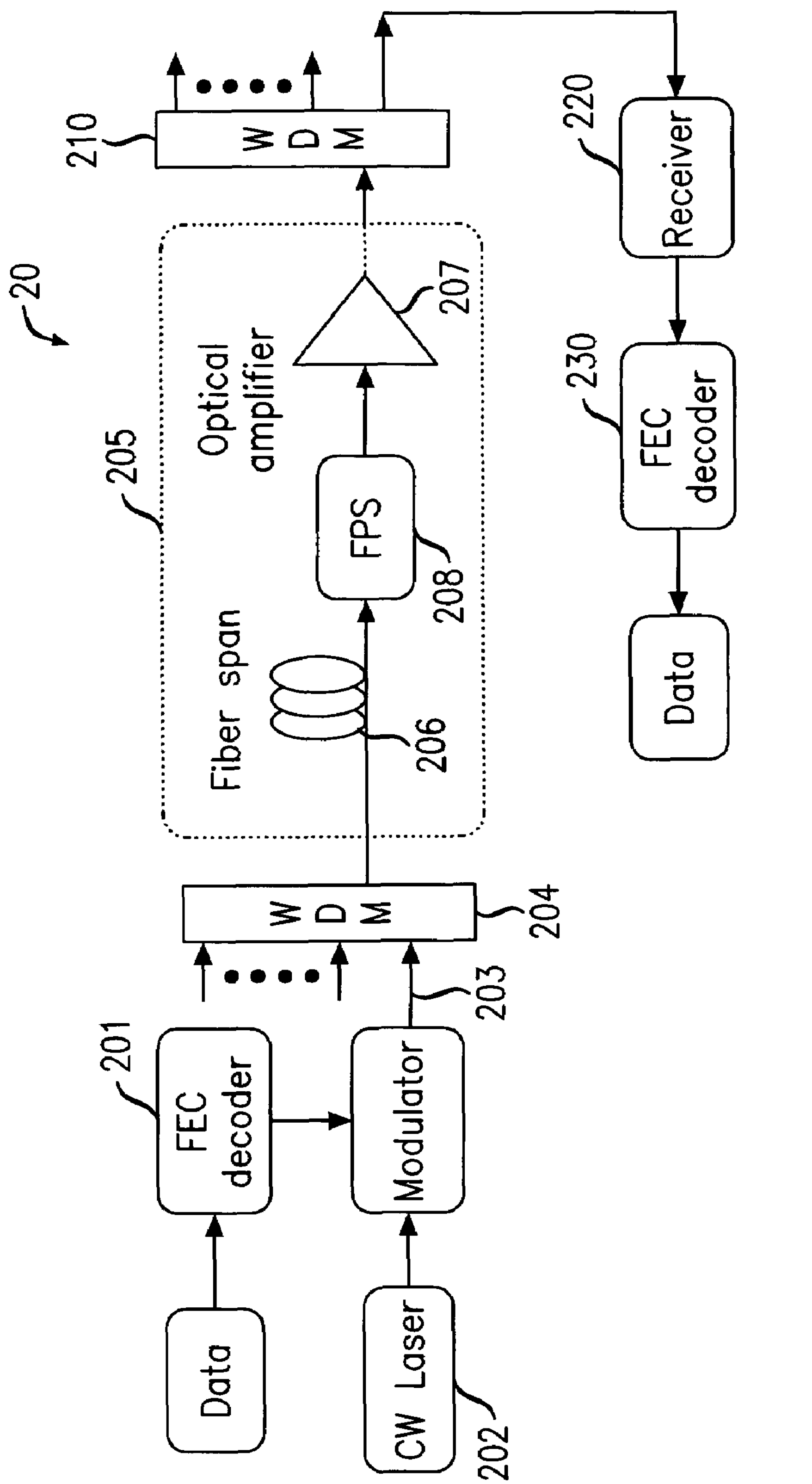
FIG. 2 is a diagram depicting one embodiment of a system according to the invention.

One embodiment of a system 20 in accordance with the invention is shown in FIG. 2. In operation, a high-speed signal (e.g., OC192) is first FEC encoded by an FEC encoder 201, and then used to modulate light from a light source 202, forming a wavelength channel 203. A plurality of channels are multiplexed in a wavelength-division-multiplexer (WDM) 204 and transmitted through a transmission link which comprises one or more transmission spans 205. The transmission spans 205 preferably comprise one or more transmission fiber spans 206, one or more optical amplifiers 207 (e.g., EDFAs), and, if necessary, dispersion compensating modules (DCMs, not shown).

In the embodiment shown in FIG. 2, a fast polarization scrambler (FPS) 208 is positioned within the span 205. It can be understood by those skilled in the art that one or more FPSs 208 can be distributed along a link. (e.g., they can be added in one or more of the amplified spans 205). Preferably the FPSs 208 are positioned along the link where the signal power is relatively high (e.g., after an optical amplifier) so that the OSNR degradation due to the loss from the FPSs is substantially minimized. It is also preferred that the FPSs 208 are uniformly distributed along the link (e.g., spaced along the link based on PMD values of the spans within the link) so that the link PMD is more effectively redistributed.

The FPS 208 can be a single-stage $LiNbO_3$ based phase modulator, or any other device, such as a fiber-based scrambler, that provides sufficient polarization scrambling. Preferably, multiple stages of polarization scrambling are employed to be able to randomize signal polarization, independent of the input signal polarization state.

At a receiver side of the system 20, WDM channels are de-multiplexed by demultiplexer 210 and then individually detected at a receiver 220, followed by FEC decoding with an FEC decoder 230 to obtain the original data signal.

Figure 3A:
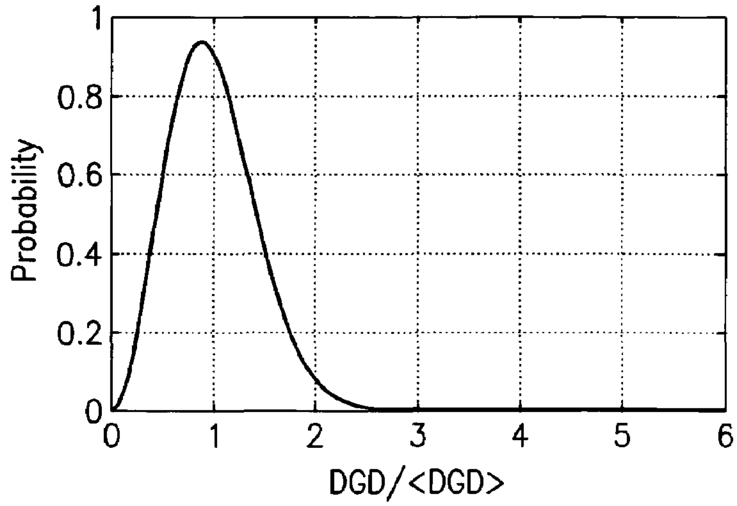
FIGS. 3A–D are plots showing the Maxwellian distribution of a link DGD; the link DGD distributions during an outage event with one FPS in the middle of the link; and the DGD distributions of the first and second half of the link during the outage, respectively.

The instant PMD of a link can be represented by a vector, $\Omega$, whose length equals the differential-group-delay (DGD) between two principle states of polarization (PSPs) of the fiber link, and whose direction is aligned with the maximum delay PSP. Generally, the distribution of DGD follows Maxwellian distribution, as shown in the plot of FIG. 3A. At some rare occasions (toward the tail of the Maxwellian distribution), instant $|\Omega|$ can be much larger than the average link DGD, $\overline{\Omega}$ (or <DGD>), resulting in a large penalty. Outage probability (OP) is commonly used to assess the probability of having PMD penalty larger than a pre-allocated amount (e.g., 2 dB in required OSNR). It is desirable to have the OP as small as possible.

Figure 3B:
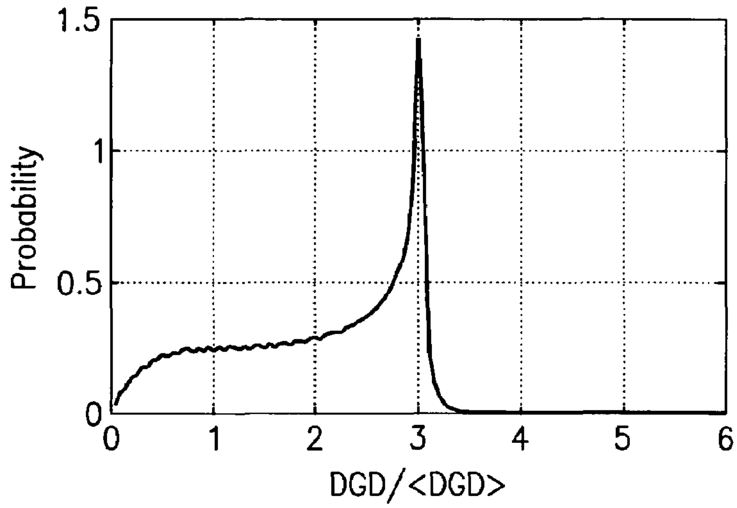
Figure 3C:
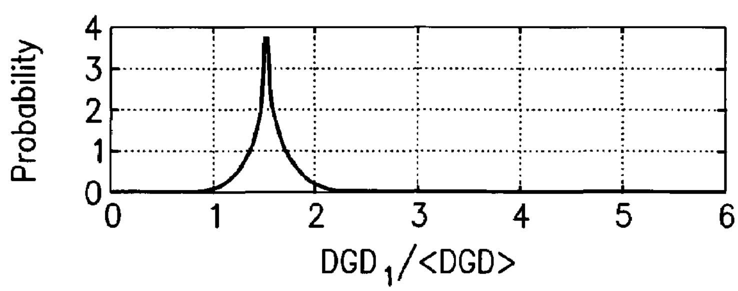
Figure 3D:
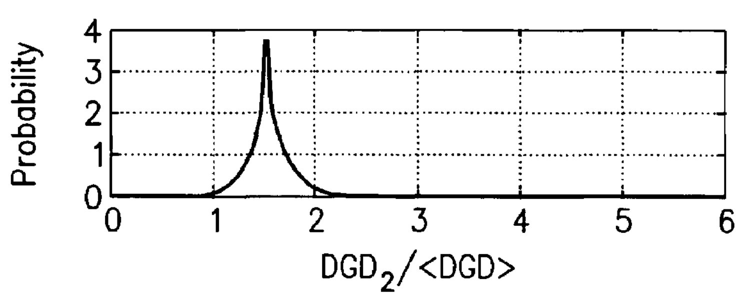

Numerical simulations have shown that OP can be reduced by using D-FPSs in accordance with embodiments of the invention. As illustrated in FIG. 3B, given an outage event during which the instant $|\Omega_0|=3\overline{\Omega}$, $|\Omega|$ is redistributed by inserting an FPS at the middle of the link. The new distribution is obtained as follows. We first find all the possible pairs of PMD vectors of the first and second half of the link, $\Omega_1$ and $\Omega_2$, that satisfy $\Omega_1+\Omega_2=\Omega$, and their occurrence probabilities. The distributions of $|\Omega_1|$ and $|\Omega_2|$ are shown in FIGS. 3C–D For each ($\Omega_1$, $\Omega_2$) pair, we rotate $\Omega_1$ on the Poincare sphere with all possible states uniformly sampled (to emulate the function of the FPS), and sum it with $\Omega_2$ to obtain a new link PMD vector, $\Omega_{new}$. The distribution of $|\Omega_{new}|$ is then obtained by calculating the relative probabilities of all the sampled DGD values and re-normalizing them. Clearly, the new distribution is no longer isolated around $3\overline{\Omega}$, but has a substantial portion around $\overline{\Omega}$.

Figure 4A:
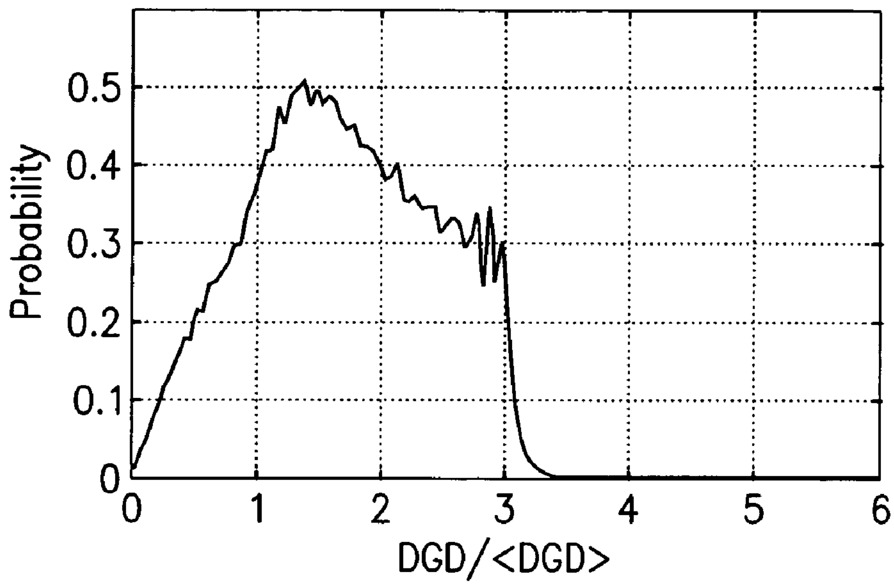
FIGS. 4A–B are plots showing the distribution of the link DGD distributions during an outage with 2 and 6 D-FPSs, respectively.
Figure 4B:
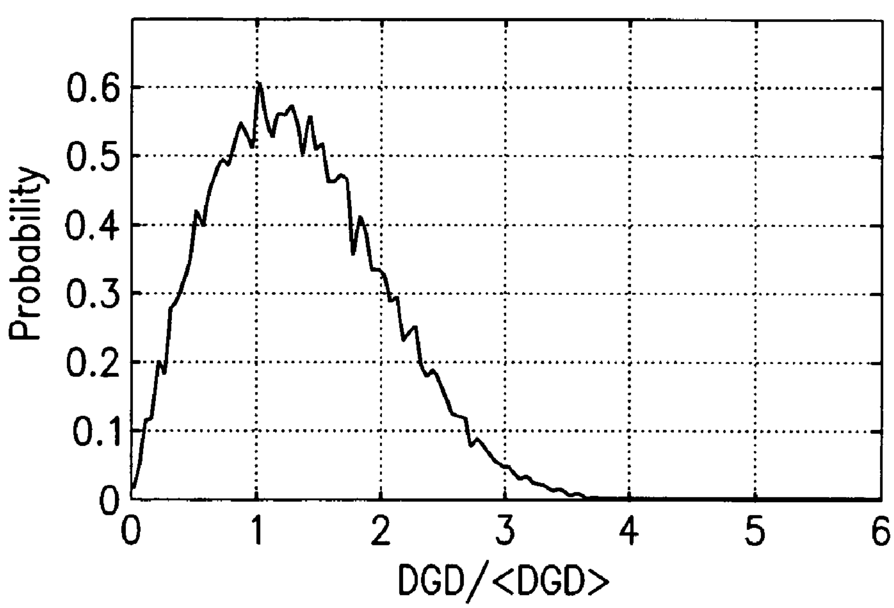

The above process was repeated for cases with 2 or more distributed FPSs 208. FIGS. 4A–B show the new DGD distribution with 2 and 6 uniformly distributed FPSs, respectively. With an increased number of FPSs 208, the DGD distribution becomes closer to the original Maxwellian distribution. It can be appreciated by those skilled in the art that the DGD distribution of the i-th section, $|\Omega_i|$, is likely to be distributed around $|\Omega|/(N+1)$ (N being the total number of D-FPSs) providing that $|\Omega|/(N+1)>\overline{\Omega}/(N+1)^{1/2}$, since the Maxwellian distribution strongly favors that $|\Omega_i|$ be close to $\overline{\Omega}/(N+1)^{1/2}$. With D-FPS, the new link $\Omega$ can be seen as the quadratic summation of all the sectional PMD vectors, and its mean value can be approximated as $$\overline{\Omega}_{new}\approx\max(\overline{\Omega}, |\Omega_0|/\sqrt{N+1}). \quad (1)$$

As N becomes sufficiently large, the new mean link PMD approaches $\overline{\Omega}$. This qualitatively explains the convergence of the new link DGD distribution from an outage event to its original Maxwellian distribution through the use of D-FPSs.

D-FPS Speed Requirement for Outage Prevention

To effectively redistribute the link DGD during an outage event to the original Maxwellian distribution, the speed requirement of FPSs 208, which is closely related to the FEC code used and the system data rate, is an important parameter. Generally, a FEC code is capable of correcting $N_{max\_frame}$ maximum number of errors per FEC frame, and $N_{max\_burst}$ maximum number of consecutive burst errors. RS-FEC has an advantageous feature that $N_{max\_burst}$ equals $N_{max\_frame}$. In one version of ITU's recommended FEC (G.709 standard), RS (255,239) code with an interleaving depth of 16 is used, resulting in $N_{max\_burst}=N_{max\_frame}=8\times16$ bytes (or 1024 bits). The corresponding burst-error-correctin (BECP) of is about 0.1 μs for 10-Gb/s systems (0.025 μs for 40-Gb/s systems). To change the state of polarization at least once during each BECP, the speed of FPS needs to be greater than about 10 MHz, and greater than about 40 MHz, for 10-Gb/s and 40-Gb/s systems, respectively. $LiNbO_3$-based PSs are capable of polarization scrambling with speeds of up to a few GHz, and may be used in accordance with the invention. Using advanced FEC codes with large burst-error-correction capability, the speed requirements of the FPSs 208 speed may be relaxed.

The performance improvement through the use of D-FPSs was accessed and is discussed below. The PMD-induced OP assuming idealized or sufficient PMD scrambling which redistributed the link DGD to the original Maxwellian distribution was considered. It was understood that there is a small probability that PMD outages may occur even after the PMD scrambling through N D-FPSs where the new link DGD is still large enough to cause system outage (or it is still larger than the specific $|\Omega|$) We can write the new OP (after sufficient PMD scrambling, $OP_{sufficient}$) as $$OP_{sufficient}(N)=M\{\overline{\Omega}+[M^{-1}(OP_0)-\overline{\Omega}]\cdot\sqrt{N+1}\}, \quad (2)$$

where M(x) is the probability of obtaining DGD that is larger than x assuming the DGD is Maxwellian distributed with mean of $\overline{\Omega}$, or $$M(x)=\int_x^{+\infty}\frac{32x^2}{\pi^2\overline{\Omega}^3}\exp\left(-\frac{4x^2}{\pi\overline{\Omega}^2}\right)dx. \quad (3)$$

Figure 5:
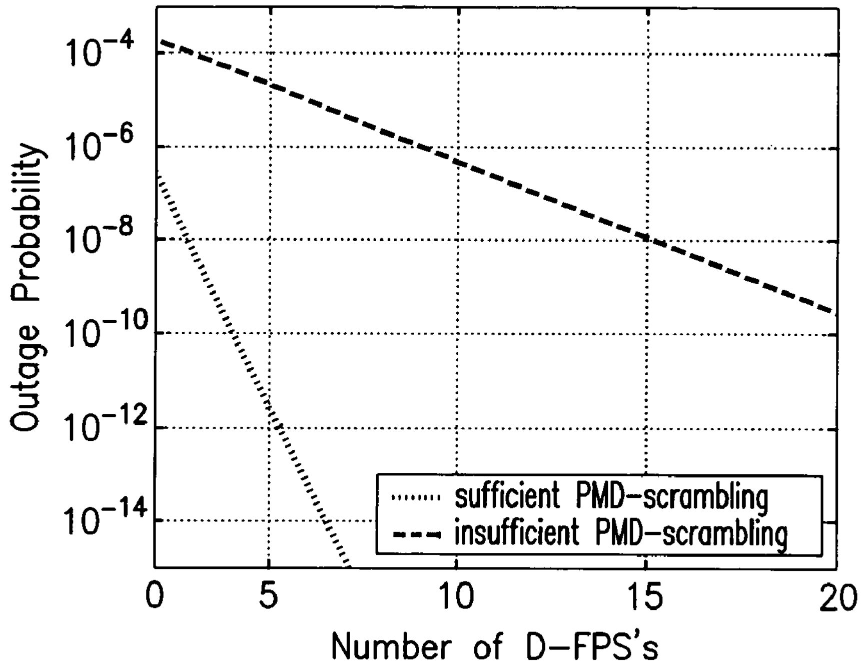
FIG. 5 is a plot showing the outage probability (OP) vs. the number of D-FPSs assuming idealized PMD scrambling (dotted line) and with insufficient scrambling speed (dashed line)

$M^{-1}(y)$ is the inverse function of M(x). FIG. 5 shows the dependence of the new OP on N for assuming the original OP to be $10^{-3}$ (dotted line for sufficient PMD scrambling). The new OP is substantially reduced with the increase of N. More than ten orders of magnitude of reduction in OP may be achieved with about 10 D-FPSs. This idealized model gives an upper limit of the outage prevention performance.

The performance of the outage prevention under insufficient polarization scrambling speed is of practical interest. The impact of insufficient scrambling speed is the reduction of the effective number of D-FPSs. We can extend Eq. (3) to take into consideration the impact as $$OP_{insufficient}(N)\approx\sum_{m=0}^{N}OP_{sufficient}(m)\binom{N}{m}p^m(1-p)^{N-m} \quad (4)$$

where p is the ratio between the actual PS speed and the required speed. For example, p=0.8 for FPS with 8-MHz speed in 10-Gb/s systems. The outage prevention performance with p=0.8 is shown with a dashed line in FIG. 5. While insufficient FPS speed strongly degrades the performance, OP can still be significantly reduced from $10^{-3}$ to $<10^{-9}$ with 20 D-FPSs. As can be understood from the above results, the present invention provides for the effective elimination of PMD-induced system outages.

Improvement of PMD Tolerance

Figure 6:
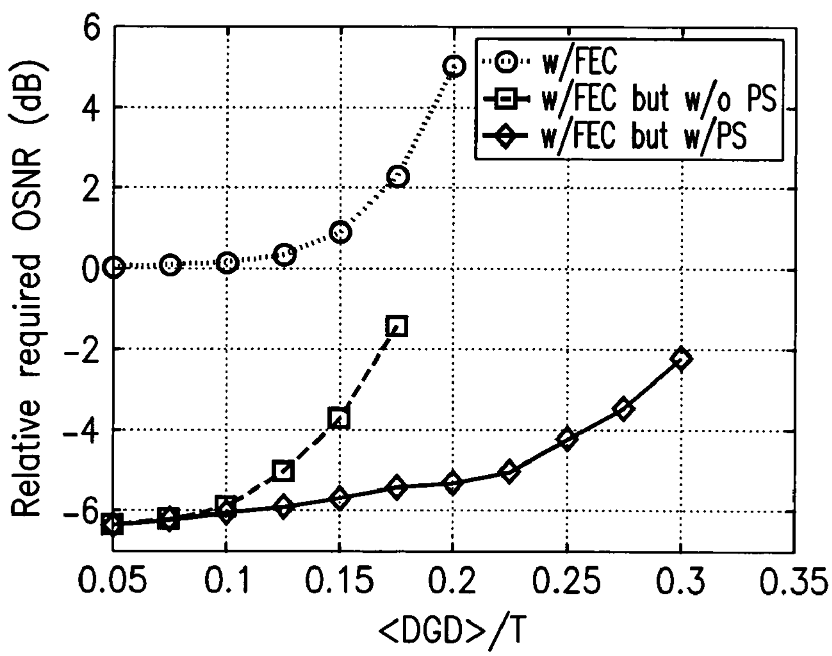
FIG. 6 is a plot showing the relative required OSNR to achieve BER=$10^{-15}$ as a function of PMD without FEC (circles), with FEC and no D-FPSs (squares), and with FEC and D-FPSs (diamonds)
Figure 7:
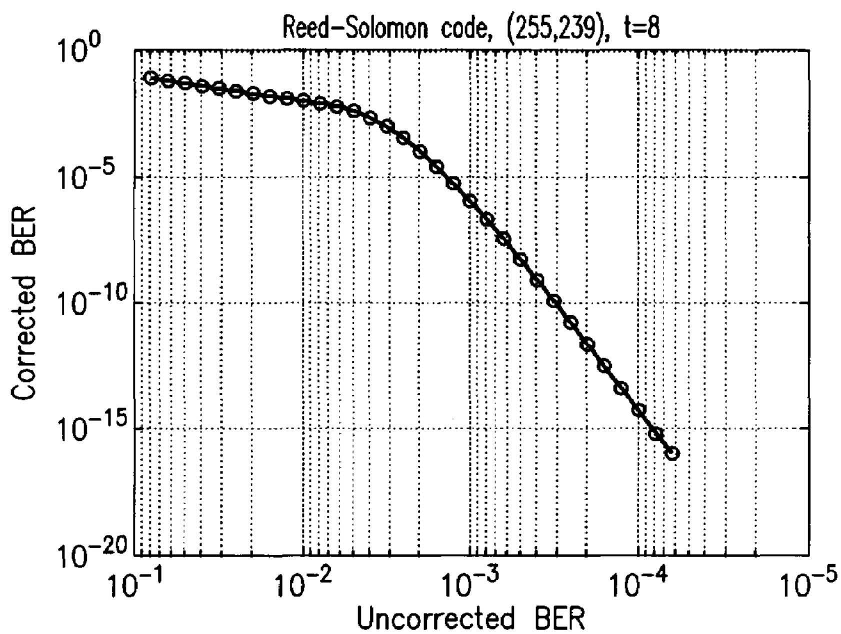
FIG. 7 is a plot showing the dependence of corrected BER (by FEC) on uncorrected BER.

The dependence of OSNR penalty on PMD is important to evaluate the system tolerance to PMD. FIG. 6 shows the relative required OSNR (as compared to that without FEC and without PMD) for achieving a BER of $10^{-15}$ as a function of mean link PMD in a conventional non-return-to-zero (NRZ) on-off-keyed (OOK) transmission system. When no FEC is used, the decision threshold and phase are optimized on a bit-by-bit basis or optimized for each case of instant link PMD, assuming the link PMD is slow varying and the receiver can track the change. OSNR penalty of 2 dB occurs as the mean system DGD reaches about 17% of the bit period (T). When RS-FEC is used, the decision threshold and phase are optimized on a frame-by-frame basis for each mean link PMD. FEC provides about 6.5 dB improvement over OSNR requirement. With the increase of PMD, there is substantial difference in PMD tolerance between the cases without and with D-FPSs. The PMD tolerance (at 2-dB penalty) of system with FEC and D-FPSs is about 0.24 T, about 70% larger than that with FEC but without D-FPSs. It is noted that such performance improvement cannot be achieved by simply putting an FPS at the transmitter, which cannot avoid "bad" link PMDs. Also the PMD tolerance with FEC but without D-FPSs is smaller than without FEC. This is because of the "nonlinear" dependence of the corrected BER (by FEC) on the uncorrected BER, which normally results in much larger increase in the corrected BER when the uncorrected BER is only slightly increased (due to PMD), as shown in FIG. 7. It is thus very beneficial to take the advantage offered by D-FPSs in systems in which FEC is implemented.

The PMD tolerance is further increased when more powerful FEC codes (i.e. those having a higher uncorrected BER threshold than RS-FEC for a given corrected BER) are used with the present invention, providing the criteria for sufficient PMD scrambling is met. It can be understood by those skilled in the art that the present invention is applicable to systems and transmission methods employing various FEC codes including but not limited to Reed-Solomon codes, concatenated block codes, convolutional codes and codes with various interleaved depth.

In addition, the present invention is also applicable to systems employing non-return-to-zero (NRZ) or return-to-zero (RZ) signal formatting, and/or on-off keying, differential phase-shift-keying (DPSK), differential quadrature-phase-shift-keying (DQPSK) modulation formatting, or the like. Additionally, the tolerance to PDL and PDG can be significantly improved with the use of D-FPSs in systems with FEC. As discussed above with regard to PMD mitigation, the present invention is effective in substantially reducing the PDL and PDG induced outages by quickly redistributing the link PDL and PDG to allow FEC to correct transmission errors, substantially reducing outage probability.

We note that polarization scramblers also scramble the phases of the signal bits, and polarizing scrambling with very high speed (comparable to the data rate, BR) may cause large signal spectrum broadening (e.g., about two times the spectrum of the transmitted signal) and penalty. It is therefore preferable that the PS speed (i.e. approximately the inverse of the time period for a $\pi$ phase change of the signal) is between about 0.5BR/FEC-BECL (the minimum requirement for sufficient PMD scrambling) and about BR/N (e.g., 1 GHz for a 10 Gb/s system (4 GHz for a 40 Gb/s system) with 10 D-FPSs and ITU G.709 recommended RS-FEC).

For systems employing on-off-keying the PS speed is preferably between about 0.5BR/FEC-BECL and the lesser of about BR/(8×ID) and about BR/N, where BR is the system bit rate, FEC-BECL is the forward error correction burst error correction length, ID is the interleaving depth of the forward error correction, and N is the number of polarization scramblers.

For systems employing DPSK modulation formatting the PS speed is preferably between about 0.5BR/FEC-BECL and the lesser of about BR/(8×ID) and about 0.1BR/N, where BR is the system bit rate, FEC-BECL is the forward error correction burst error correction length, ID is the interleaving depth of the forward error correction, and N is the number of polarization scramblers.

Additionally, it can be appreciated by those skilled in the art that one advantage of the present invention over PMDC is that the present invention does not require polarization monitoring and feedback control, and can operate in a set-and-forget mode.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

We claim:

1. An optical transmission system employing forward error correction comprising:

at least one polarization scrambler positioned along a transmission link;

wherein the at least one polarization scrambler is adapted to vary the polarization state of an optical signal to vary the polarization mode dispersion experienced by the signal at least once during each burst-error-correcting-period of the forward error correction employed by the system; and wherein the speed of the at least one polarization scrambler is between about 0.5 BR/FEC-BECL and BR/N. where BR is the system bit rate, FEC-BECL is the forward error correction burst error correction length and N is the number of polarization scramblers.

2. The optical transmission system of claim 1 wherein the at least one polarization scrambler is a multiple-stage phase modulator.

3. The optical transmission system of claim 2 wherein the stages of the multiple-stage phase modulator are driven by sinusoidal drive signals having one or more different amplitudes and frequencies.

4. The optical transmission system of claim 1 wherein the system employs on-off-keying modulation formatting.

5. The optical transmission system of claim 4 wherein the speed of the at least one polarization scrambler is between about 0.5BR/FEC-BECL and the lesser of about BR/(8×ID) and about BR/N, where BR is the system bit rate, FEC-BECL is the forward error correction burst error correction length, ID is the inteileaving depth and N is the number of polarization scramblers.

6. The optical transmission system of claim 1 wherein the system employs differential phase-shift-keying modulation formatting.

7. The optical transmission system of claim 6 wherein the speed of the at least one polarization scrambler is between about 0.5BR/FEC-BECL and the lesser of about BR/(8×ID) and about 0.1 BR/N, where BR is the system bit rate, FEC-BECL is the forward error correction burst error length, ID is the interleaving depth and N is the number of polarization scramblers.

8. The optical transmission system of claim 1 wherein the at least one polarization scrambler is a multiple-stage fiber-based scrambler.

9. The optical transmission system of claim 8 wherein the multiple stages of the fiber-based scrambler are driven by sinusoidal drive signals with different amplitudes and frequencies.

10. The optical transmission system of claim 1 wherein the polarization scrambler(s) are uniformly distributed along the link.

11. The optical transmission system of claim 1 wherein the polarization scrambler(s) are positioned along the link in locations based on the PMD values of spans within the link.

12. The optical transmission system of claim 1 wherein the polarization scrambler(s) are positioned along the link in locations with relatively high signal power to substantially minimize OSNR degradation due to loss from the polarization scrambler(s).

13. The optical transmission system of claim 1 wherein the at least one polarization scrambler is adapted to vary the polarization mode dispersion such that substantial spectral broadening is avoided.

14. The optical transmission system of claim 1 wherein the system employs non-return-to-zero signal formatting.

15. The optical transmission system of claim 1 wherein the system employs return-to-zero signal formatting.

16. The optical transmission system of claim 1 wherein the at least one polarization scrambler is a single-stage phase modulator.

17. The optical transmission system of claim 1 wherein the at least one polarization scrambler is a single-stage fiber-based scrambler.

18. The optical transmission system of claim 1 wherein the at least one polarization scrambler is driven by sinusoidal drive signals.

19. The optical transmission system of claim 1 wherein the system employs differential quadrature-phase-shift-keying modulation formatting.

20. The optical transmission system of claim 1 wherein the system employs optical duobinary modulation formatting.

21. A method for optical transmission in a multi-channel system employing forward error correction comprising, varying the polarization state of an optical signal to effectively vary the polarization mode dispersion experienced by the optical signal at least once during each burst-error-correction-period of the forward error correction employed by the system and wherein the polarization state is varied using one or more polarization scramblers having a speed of between about 0.5BR/FEC-BECL and about BR/N, where BR is the system bit rate. FEC-BECL is the forward error correction burst error correction length and N is the number of polarization scramblers.

22. The method of claim 21 wherein the transmission system employs on-off-keying modulation formatting and wherein the polarization state is varied using one or more polarization scramblers having a speed of between about 0.5BR/FEC-BECL and the lesser of about BR/(8×ID) and about BR/N where BR is the system bit rate, FEC-BECL is the forward error correction burst error correction length, ID is the interleaving depth and N is the number of polarization scramblers.

23. The method of claim 21 wherein the transmission system employs differential phase-shift-keying modulation formatting and wherein the polarization state is varied using one or more polarization scramblers having a speed of between about 0.5BR/FEC-BECL and the lesser of about BR/(8×ID) and about 0.1BR/N, where BR is the system bit rate, FEC-BECL is the forward error correction burst error correction length, ID is the interleaving depth and N is the number of polarization scramblers.

24. An optical transmission system employing forward error correction comprising:

at least one polarization scrambler positioned along a transmission link;

wherein the at least one polarization scrambler is adapted to vary the polarization state of an optical signal to vary the polarization mode dispersion experienced by the signal at least once during each bursterror-correcting-period of the forward error correction employed by the system and the system employs a modulation formatting scheme selected from the group consisting of: on-off-keying modulation formatting; differential phase-shift keying modulation formatting; optical duobinary modulation formatting and differential quadrature-phase-shift-keying modulation formatting.

25. The optical transmission system of claim 24 wherein the speed of the at least one polarization scrambler is between about 0.5BR/FEC-BECL and the lesser of about BR/(8×ID) and about 0.1BR/N, where BR is the system bit rate, FEC-BECL is the forward error correction burst error length, ID is the interleaving depth and N is the number of polarization scramblers.

26. An apparatus for transmitting optical signals in a system employing forward error correction comprising, means for varying the state of polarization of the optical signals at least once during each burst-error-correction-period of the forward error correction code employed by the system; and wherein the polarization state varying means operates at a speed of between about 0.5BR/FEC-BECL and about BR/N, where BR is the system bit rate, FEC-BECL is the forward error correction burst error correction length and N is the number of polarization varying means.

27. An optical transmission system employing forward error correction comprising:

at least one polarization scrambler including a multiple stage phase modulator wherein the multiple stages of the multiple-stage phase modulator are driven by sinusoidal drive signals having one or more different amplitudes and frequencies, said at least one polarization scrambler being positioned along a transmission link;

wherein the at least one polarization scrambler is adapted to vary the polarization state of an optical signal to vary the polarization mode dispersion experienced by the signal at least once during each burst-error-correcting-period of the forward error correction employed by the system.

28. An optical transmission system employing forward error correction comprising:

at least one polarization scrambler including a multiple stage fiber-based scrambler wherein the multiple stages of the fiber-based scrambler are driven by sinusoidal drive signals with different amplitudes and frequencies, said at least one polarization scrambler being positioned along a transmission link;

wherein the at least one polarization scrambler is adapted to vary the polarization state of an optical signal to vary the polarization mode dispersion experienced by the signal at least once during each burst-error-correcting-period of the forward error correction employed by the system.

* * * * *

UNITED STATES PATENT AND TRADEMARK OFFICE

CERTIFICATE OF CORRECTION

PATENT NO. : 7,010,180 B2 
APPLICATION NO. : 10/639824
DATED : March 7, 2006
INVENTOR(S) : de Lind Van Wijngaarden et al.

It is certified that error appears in the above-identified patent and that said Letters Patent is hereby corrected as shown below:

Title page item (12), replace “van Wijngaarden et al.” with --de Lind van Wijngaarden et al--.

Signed and Sealed this

Eleventh Day of July, 2006

JON W. DUDAS
*Director of the United States Patent and Trademark Office*